Oct. 6, 1959 F. B. WALDRON 2,907,311
VALVE OPERATING MECHANISM OF RECIPROCATING
INTERNAL COMBUSTION ENGINES
Filed Sept. 4, 1957
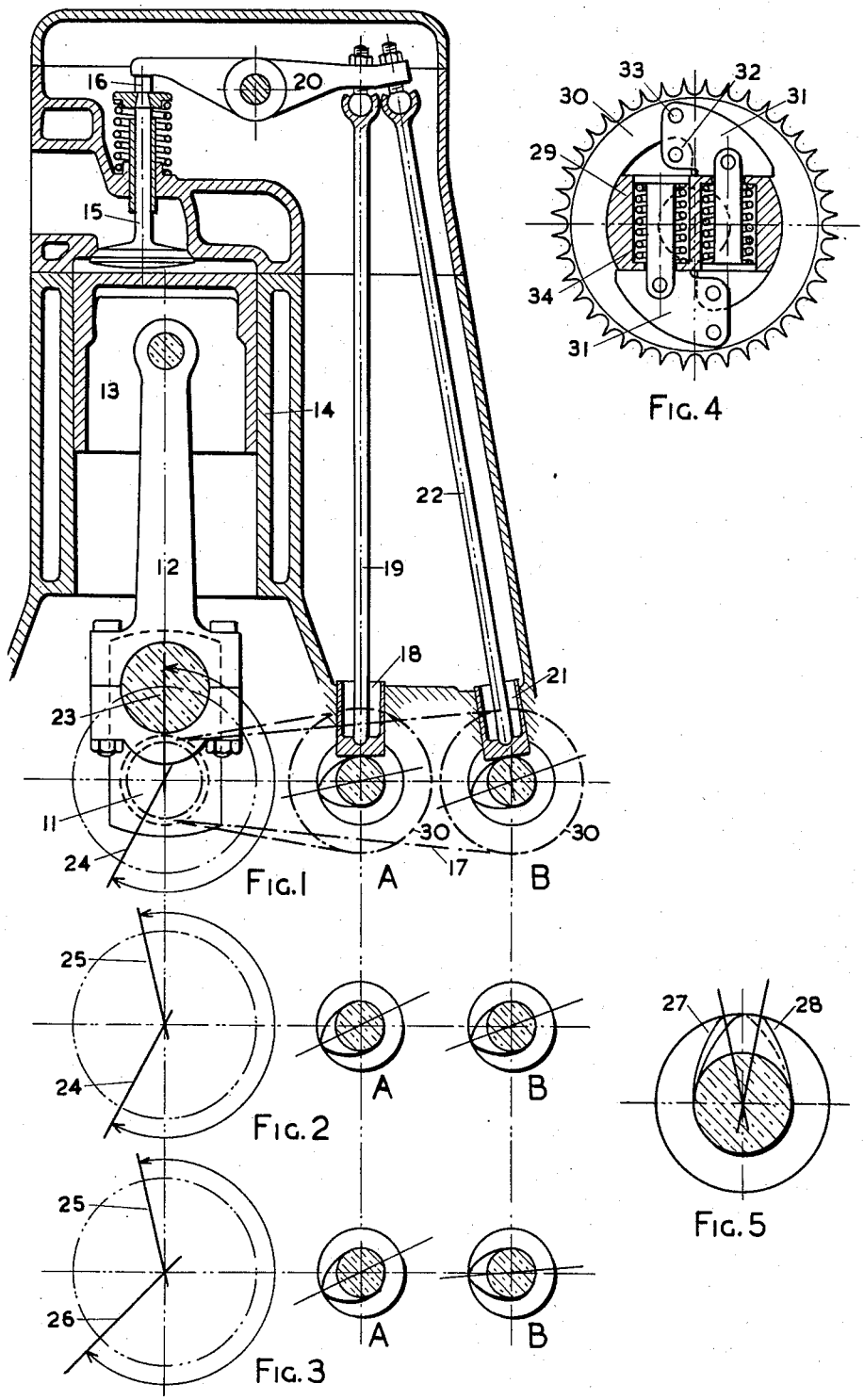
Frederic B. Waldron.

United States Patent Office 2,907,311
Patented Oct. 6, 1959

2,907,311

VALVE OPERATING MECHANISM OF RECIPROCATING INTERNAL COMBUSTION ENGINES

Frederic Barnes Waldron, Prescot, England

Application September 4, 1957, Serial No. 681,981

3 Claims. (Cl. 123—90)

This invention relates to improvements in the valve operating mechanism of reciprocating internal combustion engines and has for its object an adjustment in the timing of opening and closing of the valves which admit and release the gases in the cylinders.

The valves are usually of the poppet type operated by cams on a shaft which is driven at a fixed ratio from the engine crankshaft.

Hitherto one cam has operated one valve and the angle between the crank and the cam has been chosen for such timing as is expected to give the best all round performance. This timing is always a compromise because the best setting for one engine speed will not be the best for another engine speed.

There have been arrangements for using a centrifugal governor to alter the timing of the cam shaft but the result has been to shift the period during which the valve is open leaving it open for the same period but making that period earlier or later. This does not give the optimum efficiency for the engine because at higher speeds the valve should remain open for a longer period and this I achieve by both advancing the opening and retarding the closing of the valve.

The centrifugal governors hitherto in use for controlling the valve timing have been of a type in which there has been a gradual angular displacement of the cam shaft for a gradual variation in speed but I find it much better to have the complete angular displacement take place in the least possible time at a predetermined speed.

My invention provides means for automatically altering the timing of the valves to give the best results for different speeds of the engine.

This is achieved by fitting two cam shafts A and B both of which operate on each valve and both are given an angular adjustment automatically by separate centrifugal governors. At slow speeds of the engine both cam shafts are in unison and actuate the valves at the same timing. When the engine speed increases to say one third its full speed the cam shaft A will advance say 10 or 15 degrees and open the valve earlier by that amount while cam shaft B may remain unaltered to give an unaltered closing time or it may be retarded say 10 or 15 degrees automatically at a predetermined speed to leave the valve open longer by that amount.

A convenient method of carrying out the invention is shown in the accompanying drawing in which:

Fig. 1 is a sectional elevation showing one cylinder of the engine with its inlet valve and both cams in the slow running position.

Fig. 2 is a section showing in the advanced position the cam which controls the opening of the inlet valve.

Fig. 3 is a section showing in the retarded position the cam which controls the closing of the inlet valve.

Fig. 4 is a section through the centrifugal governor.

Fig. 5 shows the tips of the cams shaped to carry over from one to the other without discontinuity in the movement of the valve.

Referring to Fig. 1 the crank shaft of the engine is shown at 11 with connecting rod 12 and piston 13 which reciprocates in cylinder 14. The inlet valve is shown at 15.

The two cam shafts A and B are driven by chain 17 at a ratio of one or two from camshaft 11. The cam on shaft A controls the opening of the valve. It operates tappet 18, push rod 19 and rocker arm 20 which in turn operates the valve by contact with the tip of its stem 16. The cam on shaft B controls the closing of the valve. It operates tappet 21, push rod 22 and rocker arm 20. The valve in slow running position opens at angle 23 and closes at angle 24.

In Fig. 2 the centrifugal governor on cam shaft A has come into operation with an increase of engine speed and has adjusted the angular relation of the cam to the crankshaft so as to cause the inlet valve to open earlier. The valve now opens at angle 25 and closes at angle 24.

In Fig. 3 the centrifugal governor on cam shaft B has come into operation with an increase of engine speed and adjusted the angular relation of the cam to the crankshaft so as to cause the valve to close later. The valve now opens at angle 25 and closes at angle 26.

The speeds of the engine at which these adjustments occur will be chosen by testing the engine and may be simultaneous for A and B or either one may be earlier or later than the other.

The exhaust valve will be actuated in a similar manner to the inlet valve. When cam on shaft A advances the opening of the inlet valve the cam operating the exhaust valve from the same shaft will also advance and open the exhaust valve earlier and when cam on shaft B retards the closing of the inlet valve the cam operating the exhaust valve from the same shaft will also retard and close the exhaust valve later.

Fig. 4 is a section of a preferred arrangement of the centrifugal governor. It comprises a housing 29 keyed to the cam shaft and carrying a sprocket wheel 30 rotatable about it and driven from the engine crankshaft by chain 17. The centrifugal weights 31 are pivoted on the housing at 32 and on the sprocket wheel at 33 so that when the weights move in or out it alters the angle between them. The restraining springs are shown at 34. It is preferred to choose them so that the rate of increase in the force of the springs is less than the rate of increase in centrifugal force of the weights as they move outwards so that at a predetermined speed the weights will move instantly through their complete travel.

Assuming a governor with weights of one pound revolving at a radius from the axis of its shaft of two inches minimum to 2½ inches maximum. Then if the shaft speed increases to 1000 r.p.m. their centrifugal force will range from 57 lbs. to 70 lbs. thus giving an increase in centrifugal force of the weights of 13 lbs. when the weights move out through a distance of half-an-inch. If the spring is chosen to give a pull of 57 lbs. which only increases by 10 lbs. to 67 lbs. with an extension of half-an-inch while the centrifugal force of the weights increases by 13 lbs. the weights will instantly fly out to their extreme position. When the speed of the shaft is then reduced it will drop to 973 r.p.m. before the centrifugal force of the weights drops to 67 lbs. and at that speed the weights will move immediately to their inner position. Below 973 r.p.m. and above 1000 r.p.m. the position of the weights will be positive and between these speeds there is no equilibrium to cause hunting. A governor with these characteristics is preferred but one may be used in which the springs are designed to give considerable variation in speed between the inward and outward positions of the weights.

Fig. 5 shows a cam in one extreme position 27 and then superimposed is shown the other cam 28 in the other extreme position. Both these cams operate at the same time on toppet 18, rocker arm 20 and valve 15 and it is desired that there be no interruption in the steady movement of the mechanism. If the cams are made with a narrow tip there will be a period between them which will allow a slight negative movement. The tips of the cams are therefore given a dwell of sufficient width to ensure continuity from one to the other.

The drawing shows an engine of the type with overhead valves operated with tappets, push rods and rocker arms but these may be substituted by any arrangement or number of valves or types thereof and any mechanism which is capable of being operated from two cam shafts with angular adjustment. The angular adjustment may be of any practicable amount.

The two push rods are shown acting on the rocker arm at different distances from its fulcrum and the throw of the cams may be made proportional but the push rods may be arranged side by side at equal distances from the fulcrum in which case the cams are preferred to be of equal throw.

Having described my invention I declare that what I claim is:

1. Valve operating mechanism for internal combustion reciprocating engines in which each valve is actuated by two cams and the angular position of each cam is adjusted by a separate centrifugal governor to give the best timing for the opening and closing of the valve to suit the varying speed of the engine.

2. A valve operating mechanism as in claim 1 in which the angular adjustment of each cam shaft is actuated by a centrifugal governor in which the rate of increase in the force of the governor spring is less than the rate of increase of the centrifugal force of the governor weights as they move outwards so that at a predetermined speed they will move instantly through their complete travel.

3. A valve operating mechanism as in claim 1 in which the tip of each cam is shaped with a slight dwell to carry over from one cam to the other without producing discontinuity in the movement of the valve.

References Cited in the file of this patent

UNITED STATES PATENTS

| 2,120,612 | Isakson | June 14, 1938 |

FOREIGN PATENTS

| 543,563 | Great Britain | Mar. 4, 1942 |
| 654,240 | Great Britain | June 13, 1951 |